United States Patent [19]

Raycher et al.

[11] Patent Number: 5,070,226
[45] Date of Patent: Dec. 3, 1991

[54] INTERACTIVE STUD WELDING GUN

[75] Inventors: Robert J. Raycher, Vincentown; Ronald A. Cangro, Clementon, both of N.J.

[73] Assignee: Erico Fastening Systems, Inc., Moorestown, N.J.

[21] Appl. No.: 447,894

[22] Filed: Dec. 8, 1989

[51] Int. Cl.$^5$ ............................................... B23K 9/20
[52] U.S. Cl. ........................................................ 219/98
[58] Field of Search .................................... 219/98, 99

[56] References Cited

U.S. PATENT DOCUMENTS

| | | | |
|---|---|---|---|
| 1,995,001 | 3/1935 | Ito | 219/98 |
| 4,415,792 | 11/1983 | Jordan | 219/98 |
| 4,456,808 | 6/1984 | Wilkinson et al. | 219/98 |
| 4,804,811 | 2/1989 | Raycher et al. | 219/98 |

Primary Examiner—Clifford C. Shaw
Attorney, Agent, or Firm—Charles F. Duffield

[57] ABSTRACT

A stud welding system which utilizes a stud welding gun capable of interacting with the stud welding power supply and welding controller in a manner such that the extent and rate of lift, duration of holding and lift position and extent and rate of plunge can be independently varied and controlled over a wide range. The interactive stud welding gun utilizes a stepping motor in the stud welding gun which actuates the gun shaft assembly and its associated chuck carrying the stud to be welded. A transducer associated with the stud welding gun senses the position of the gun shaft assembly relative to the gun body and provides a reference signal therefor. A microprocessor controlled interactive gun control responds to the signal from the tranducer to determine gun shaft assembly position and generates an energization signal for the stepping motor to drive the gun shaft between lift, hold and plunge positions preprogrammed into the interactive gun control.

4 Claims, 2 Drawing Sheets

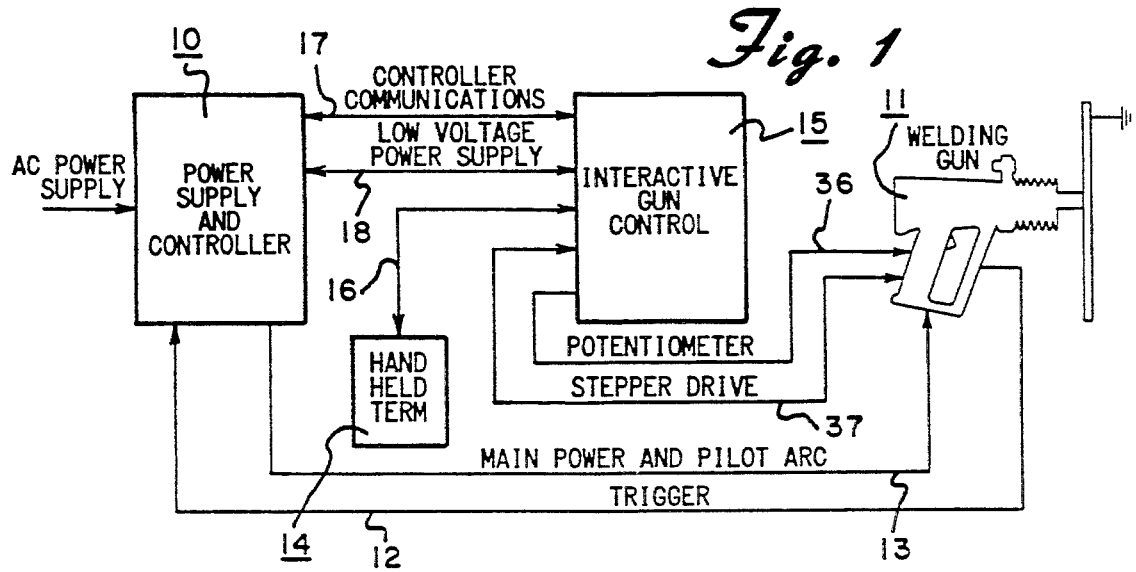

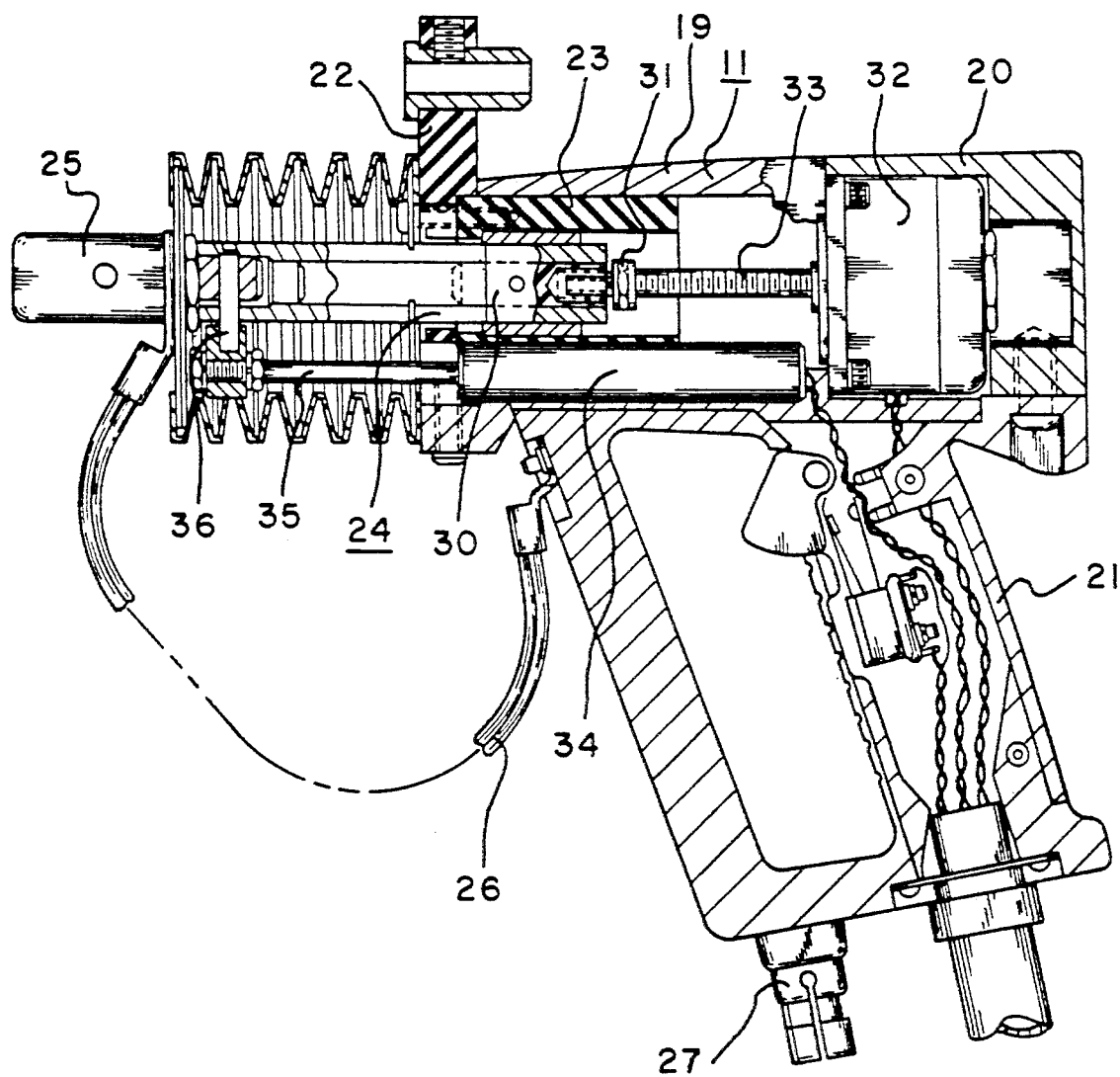

INTERACTIVE STUD WELDING GUN

BACKGROUND OF INVENTION

The present invention applies to the art of stud end welding and, more particularly, to a stud end welding system which includes a stud welding gun which is interactive with the stud welding power supply and control circuitry to provide predetermined lift, hold and plunge of the stud.

A typical stud welding system will include a power supply and associated control circuitry operating in conjunction with a stud welding gun.

A typical stud welding gun is the type which includes a gun body and movable therein a gun shaft which includes a stud chuck at one end thereof. The opposite end of the gun shaft positioned within the stud welding gun body cooperates in conjunction with a clutch mechanism.

The typical stud welding gun will include an electric solenoid which is interconnected to the clutch mechanism. When the gun is positioned in place for welding, the clutch mechanism will permit the gun shaft assembly and the stud within the stud chuck to assume a reference data plane.

The power supply and control circuitry is interconnected to the trigger of the stud welding gun. Upon closure of the gun trigger, the gun solenoid retracts the gun shaft assembly and included gun chuck and stud a predetermined distance The control circuitry within the power supply then releases the gun solenoid which is biased by spring means toward the plunge direction. In some cases, the plunge may be appropriately dampened either pneumatically or hydraulically.

The length of plunge in a typical stud welding gun is controlled by the distance the stud must travel to reach the molten pool of metal at the workpiece. This essentially is the sum of the amount of lift plus the burnoff of the stud. In a like manner, the speed of the plunge is controlled by the spring pressure and the dampening effect of any dampening mechanism all of which can wear or fall out of adjustment and thus become inconsistent. Thus, too slow of a plunge will result in improper fusion bonding of the stud with the workpiece while too fast of a plunge will result in splattering of the molten metal. Lastly, the typical length of plunge in conventional stud welding guns is of approximately ⅜" or less.

In a conventional and typical stud welding gun as different sizes or diameters of studs are welded, the internal mechanism of the stud welding gun must be changed to accommodate the differing length of plunge and speed of plunge required.

A stud welding system is needed in the industry which can independently and automatically vary the extent of lift and speed of lift, retention of the stud in lifted position and the extent and speed of plunge over a wide range. The interactive stud welding gun of the present invention provides that flexibility.

SUMMARY OF INVENTION

The stud welding system of the present invention which provides for interaction between the stud welding gun and the power supply and control circuitry associated therewith consists of four major components, i.e. the power supply and control circuitry, the stud welding gun powered by the power supply and controlled by the control circuitry, a handheld terminal providing remote input to the power supply and control circuitry and an interactive gun control.

The stud welding gun has substituted therein, for the conventional clutch and solenoid, a stepping motor. The stepping motor, upon receipt of an energization signal, will step through predetermined revolutions. The output shaft of the stepping motor is threaded and drives a nut associated with the gun shaft assembly of the stud welding gun. The stepping motor may be driven in either direction to effect lift or plunge of the gun shaft assembly.

The stud welding gun further includes a potentiometer or transducer. The potentiometer or transducer is interconnected between the gun shaft assembly and the gun body. Movement of the gun shaft assembly relative to the gun body results in the potentiometer or transducer providing a reference signal indicative of the position of the gun shaft assembly relative to the gun body.

The power supply and control circuitry are of a commercially available design. The control circuitry of the power supply is in circuit with the gun trigger and, upon energization, initiates the welding process which includes establishment of the pilot arc and main welding power as well as regulation of the main welding power.

A handheld terminal is in communication with the control circuitry of the power supply through an interactive gun control. The handheld terminal is used to set such parameters as pilot arc and main welding power and voltage settings and to display back the welding parameters such as energy of the last weld, number of good welds, pilot arc current of the last weld, weld time, etc. The handheld terminal and its associated control circuitry are part of commercially available equipment.

The interactive gun control is a microprocessor controlled device. The interactive gun control reads the potentiometer or transducer for a determination of the relative position of the gun shaft assembly relevant to the gun body. The interactive gun control, through preselected data placed in memory, operates to pulse or step the stepping motor for lift and plunge a predetermined number of pulses to achieve a preselected distance of lift and plunge as well as to control the rate of lift and plunge all as placed in the memory of the microprocessor controlled interactive gun control through the handheld terminal.

Other advantages and objects of the present invention will become apparent to those skilled in the art from the detailed description thereof which follows taken in conjunction with the drawings.

DESCRIPTION OF DRAWINGS

FIG. 1 is a block diagram of the complete interactive stud welding system of the present invention;

FIG. 2 is a block diagram of the interactive gun control of the present invention; and FIG. 3 is a side view partially in section of the interactive stud welding gun of the present invention.

DETAILED DESCRIPTION OF INVENTION

FIG. 1 illustrates in block diagram the overall components of the interactive stud welding system of the present invention. A power supply and controller 10 is provided. The power supply and controller 10 is a microprocessor controlled device and is sold by the assignee of the present invention under the model No. EMM1400 and EMM2500. Additionally, this power supply and controller is the subject matter of U.S. Pat. No. 4,456,808 issued June 26, 1984 which is now assigned to the assignee of this invention. The disclosure of this patent is incorporated into this application hereby by reference thereto.

The power supply and controller is a microprocessor controlled power supply which closely regulates the total energy in a weld and also provides numerous elements of data such as total weld energy, weld cycles, welded voltage and the like all as explained in the aforesaid patent. Additionally, the power supply and controller 10 provides computation of various data for subsequent display such as number of good welds, total weld energy and the like together with various error codes indicating faults which have occurred during the welding process again as further explained in the aforesaid patent. However, it is to be understood that reference to U.S. Pat. No. 4,456,808 is not considered to be limiting as to the scope of the invention.

The power supply and controller 10 is in direct communication with the trigger circuitry of a welding gun 11 which will be described hereinafter. Basically upon the pressing of the trigger of the welding gun 11, the power supply and controller 10 will sense the closing of the trigger via line 12 and the weld cycle for the power supply and controller 10 will proceed generally as set forth in U.S. Pat. No. 4,456,808. Likewise, the power supply and controller 10 provide the pilot arc and main power via a weld cable 13 directed to the welding gun 11 in a conventional manner.

The interactive stud welding system of the present invention may also operate in conjunction with a handheld terminal 14. As to be explained in more detail in reference to FIG. 2, the handheld terminal 14 via a communications link through an interactive gun control 15 via control cables 16 and 17 provides an input to the power supply controller 10 and receives certain data therefrom. In general, the handheld terminal 14 may be used to program the power supply and controller 10 for such parameters as pilot arc current, weld current, the voltage and time thereof. Additionally, the power supply and controller 10 via the communications path described will transmit data back to the handheld terminal 14 to display the actual readout of such parameters as the total weld energy, welding current and pilot arc current, cycles thereof and various error codes indicative of good welds, bad welds and the like. The handheld terminal 14 and the various parameters which may be set therein together with the various error codes are the subject matter of the assignee of this invention's U.S. Pat. No. 4,804,811 issued Feb. 14, 1989 the disclosure of which is incorporated herein by reference thereto. However, the incorporation of the disclosure of U.S. Pat. No. 4,804,811 is not intended to be limiting of the scope of this invention but merely as supplementing the disclosure thereof.

The power supply and controller 10 via cable 18 provides additionally the low voltage power supply for the interactive gun control 15 to be described hereinafter.

The interactive stud welding gun 11 of the present invention is illustrated in FIG. 3 of the drawings. The stud welding gun 11 includes a body 19 to which there is secured an end cap 20. A handle 21 depends from the body 19. The handle 21 provides the interconnection for a control cable (not shown) for ultimate interconnection to the various electrical components to be described hereinafter. Forward of the body 19 is a face plate assembly 22 to which a conventional footpiece (not shown) is attached.

Positioned within the body 19 of the gun 11 is an insulated sleeve 23. Journaled within the sleeve 23 for slideable axial movement is a gun shaft assembly 24. The gun shaft assembly 24 includes at its end thereof a chuck adapter 25 for receipt of a conventional stud chuck (not shown). The chuck adapter 25 is connected by a conventional flexible welding cable 26 through the handle 21 of the stud welding gun to a conventional welding cable connector 27. In this manner, the welding energy is applied to the chuck adapter and ultimately to the chuck and stud.

The gun shaft assembly 33 at its end opposite the chuck adapter 25 and within the sleeve 23 includes a central bore 30. At the far end of the bore 30 there is secured a threaded nut 31.

Positioned within the cap 20 is a stepping motor 32. The stepping motor 32 has extending therefrom a threaded shaft 33 which is threaded into the nut 31 and the end of which projects into the bore 30. The stepping motor 32 may be of the type manufactured by Eastern Air Devices, Inc., Dover, N.H. and designated model No. LA23GCK.

The stepping motor is adapted to receive electrical pulses and to rotate either clockwise or counter clockwise depending on the nature of the pulse an incremental portion of a revolution per pulse. The stepping motor includes six lines therein for control of direction of rotation. So long as pulses are applied to the appropriate combination of lines, the stepping motor will continue to rotate in the direction and at a rotational speed determined on the lines to which the pulses are applied and the rate of such pulses. As the stepping motor rotates in either direction, the threaded shaft 33 will cause the gun shaft assembly to advance either in the lift or plunge directions. Termination of the pulses will result in the stepping motor holding the gun shaft assembly in its position relative to the gun body at the point where the pulses were stopped.

The interactive stud welding gun 11 further includes a potentiometer or transducer 34 positioned in the lower portion of the gun body 11. Forward of the transducer 34 is an actuating rod 35 which extends into the transducer at its rearward most end and which is interconnected by means of an adjustable fitting 36 to the forward end of the gun shaft assembly. Accordingly, as the gun shaft assembly 24 moves relative to the gun body 11 as driven by the stepping motor 32, the potentiometer or transducer 34 will vary its electrical characteristics proportionally in accordance with that change of the relative position of the gun shaft assembly relative to the gun body.

The particular stepping motor 32 referenced above and utilized in the embodiment being described is of the type that, when not energized, can be caused to rotate in the lift direction by the application of pressure to the stud chuck. Thus when the footpiece is in place and a stud within the stud chuck, the stud is applied against the workpiece until the footpiece comes to rest against the workpiece. At this point, an initial reference point in the potentiometer 34 is established. Likewise, the stepping motor 32 in the embodiment described has sufficient force when energized to raise the stud in lift direction and, when reversed, to apply as much as 40 pounds of force against the workpiece. A typical lead for the threaded shaft 33 in conjunction with the degree of rotation per pulse is such that the gun shaft assembly will be moved 0.0005" per pulse. The total travel of the gun shaft assembly is designed to be 2". However, as described hereinafter, the amount of lift and plunge will depend upon the size of the stud being welded and the 2" is not always used but is to provide adequate lift for the largest of stud to be welded.

Referring back to FIG. 1, the potentiometer or transducer 34 is electrically interconnected to the interactive gun control 15 via conductor 36. In a like manner, the stepper motor 32 is electrically interconnected to the interactive gun control 15 by means of conductors 37.

Referring now to FIG. 2, there is illustrated in block diagram the interactive gun control 15. In a normal welding sequence, the handheld terminal 14 will be used to pass data through a handheld communications buffer 40 via a communication multiplexer 41 and power supply communications buffer 42 back to the power supply and controller 10. Such data fed into the power supply and controller 10 would be such matters as pilot arc current and time and main welding current and time.

The interactive gun control includes a microprocessor 43 and its associated program memory 44 and nonvolatile memory 45. The handheld terminal 14 is in communication through buffer 40, multiplexer 41 and serial port 46 with the microprocessor. Entry of an appropriate code in the handheld terminal 14 will be communicated to the microprocessor and the appropriate memory to a table for selection of predetermined parameters for the lift and plunge distances and the speeds thereof as well as the duration of holding of the stud in lifted position. The microprocessor 43, under the control of its associated memories and via parallel port 47, will apply pulses to a signal conditioning and stepper drive 48 which is applied to the stepper motor via conductor 37.

The microprocessor under the control of its program at the initiation of the weld cycle will look to the potentiometer or transducer 34 for a reference signal which is transmitted via signal conditioning buffer 49 and analog to digital converter 50 to the microprocessor to establish a reference from which lift and plunge are to be measured. As the program continues, the microprocessor is monitoring the extent of the lift as reflected in the position of the transducer 34 while applying pulses at a rate to establish the lift within the predetermined time. Thereafter, the stud may be maintained in a lift position if desired for a predetermined time. Thereafter, the program continues to reverse the direction of the stepper motor 32 at a pulse rate as predetermined by the program and continue to drive the stepper motor until the proper relationship of the gun shaft assembly is reached establishing the proper distance of plunge and within the predetermined speed. At this point, the operation of the stepper motor is discontinued. Of course, during this entire process from the initiation of the weld cycle, the power supply and controller was monitoring the pilot arc and weld current, measuring total energy and making appropriate adjustments during the weld cycle.

At the conclusion of the welding cycle, the power supply and controller through the interactive gun control displays at the handheld terminal the various weld results such as total energy, number of cycles, number of bad welds, etc. Additionally, the interactive gun control will calculate and display the amount and speed of lift and plunge and duration of the retention in the lifted position.

In an alternative embodiment, the microprocessor may be programmed to respond to the input for the desired lift and plunge distances and speeds to control the stepper motor in a manner to begin a series of pulses in either the lift or plunge direction established to accomplish the desired lift and plunge distances and plunge speed and monitor the distance toward the end of the stepping cycle and make appropriate adjustments as necessary.

From the foregoing, it will be appreciated that the interactive stud welding system of the present invention utilizing the interactive stud welding gun disclosed is capable of controlling the lift and plunge speed and retention of the stud in lifted position in a positive controlled manner to thus provide consistent lift and plunge distances and speeds and hold durations while, at the same time, providing the versatility of modifying these lift distances and speeds and plunge quickly for effective welding of different sizes of studs through selection of other predetermined parameters set forth in the memory of the interactive gun control. The interactive stud welding gun through the use of a stepping motor and potentiometer interacts with the interactive gun control to assure consistent lift and plunge distances and speeds and hold duration.

The interactive stud welding system of the present invention has been described in respect to a particular type of stepping motor in the interactive handgun. However, other suitable types of drive mechanisms having a positive drive control may be used within the spirit and scope of the present invention. Additionally, the relationship of the gun shaft assembly has been described in respect to a potentiometer or a transducer. However, it is contemplated that other devices may likewise be used to provide a reference for the relationship of the gun shaft assembly to the body of the stud welding gun. Likewise, other specific devices set forth in the disclosure intended to be illustrative only of a specific embodiment within which the spirit and scope of the invention may be employed and the true spirit and scope of the invention is to be interpreted in view of the appended claims.

What is claimed is:

1. In a stud welding system including a stud welding power supply and a stud welding gun having a gun body, a gun shaft assembly and included stud chuck thereupon for retaining a stud and which is movable within the stud welding gun body between lift and plunge positions, the improvements permitting controlled positive lift and plunge of the stud comprising:

signal means interconnected between the gun shaft assembly and the gun body to provide a position signal representative of the position of the gun shaft assembly relative to the gun body;

motor means interconnected between the gun body and the gun shaft assembly to positively and progressively drive the gun shaft assembly relative to the gun body in lift and plunge directions upon the presence of an energization signal; and interactive gun control means including microprocessor means programmed to sense the position signal and provide the energization signal to drive the gun shaft to lift, hold and plunge positions of a preselected and programmed amplitude, duration and speed.

2. The stud welding system of claim 1 wherein the motor means is a stepping motor driving a threaded shaft threaded upon a cooperating nut secured to the gun shaft assembly.

3. The stud welding system of claim 1 wherein the signal means is a transducer.

4. The stud welding system of claim 3 wherein the motor means is a stepping motor driving a threaded shaft threaded into a cooperating nut secured to the gun shaft assembly.

* * * * *